(12) United States Patent
Lindner et al.

(10) Patent No.: US 11,629,949 B2
(45) Date of Patent: Apr. 18, 2023

(54) LIGHT DISTRIBUTION FOR ACTIVE DEPTH SYSTEMS

(71) Applicant: QUALCOMM Incorporated, San Diego, CA (US)

(72) Inventors: Albrecht Johannes Lindner, La Jolla, CA (US); Kalin Mitkov Atanassov, San Diego, CA (US); Stephen Michael Verrall, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1198 days.

(21) Appl. No.: 15/958,651

(22) Filed: Apr. 20, 2018

(65) Prior Publication Data
US 2019/0323827 A1  Oct. 24, 2019

(51) Int. Cl.
*G01B 11/22* (2006.01)
*G01B 11/25* (2006.01)

(52) U.S. Cl.
CPC .............. *G01B 11/22* (2013.01); *G01B 11/25* (2013.01)

(58) Field of Classification Search
CPC ................................ G01B 11/22; G01B 11/25
See application file for complete search history.

(56) References Cited

U.S. PATENT DOCUMENTS

| | | | |
|---|---|---|---|
| 9,514,378 B2 * | 12/2016 | Armstrong-Crews | H04N 13/296 |
| 2013/0002859 A1 | 1/2013 | Yamaguchi et al. | |
| 2013/0250066 A1 * | 9/2013 | Abraham | G01B 11/2513 348/46 |
| 2014/0028805 A1 * | 1/2014 | Tohme | G01B 11/2518 348/47 |
| 2016/0025993 A1 * | 1/2016 | Mor | G06V 10/145 438/27 |
| 2016/0109224 A1 * | 4/2016 | Thuries | G01B 11/2408 356/601 |
| 2017/0307736 A1 * | 10/2017 | Donovan | G01S 17/89 |
| 2018/0288388 A1 * | 10/2018 | Hicks | H01S 5/0071 |

(Continued)

FOREIGN PATENT DOCUMENTS

| | | |
|---|---|---|
| CN | 102822623 A | 12/2012 |
| CN | 102859319 A | 1/2013 |
| CN | 105319811 A | 2/2016 |

(Continued)

OTHER PUBLICATIONS

International Search Report and Written Opinion—PCT/US2019/023434—ISA/EPO—Jun. 18, 2019.

*Primary Examiner* — Luke D Ratcliffe
(74) *Attorney, Agent, or Firm* — Qualcomm Incorporated

(57) ABSTRACT

Aspects of the present disclosure relate to systems and methods for structured light depth systems. An example active depth system may include a receiver to receive reflections of transmitted light and a transmitter including one or more light sources to transmit light in a spatial distribution. The spatial distribution of transmitted light may include a first region of a first plurality of light points and a second region of a second plurality of light points. A first density of the first plurality of light points is greater than a second density of the second plurality of light points when a first distance between a center of the spatial distribution and a center of the first region is less than a second distance between the center of the spatial distribution and the center of the second region.

30 Claims, 16 Drawing Sheets

(56) References Cited

U.S. PATENT DOCUMENTS

2019/0011567 A1* 1/2019 Pacala ............... H01L 31/02027
2019/0203907 A1* 7/2019 Lefaudeux ............... F21K 9/60

FOREIGN PATENT DOCUMENTS

CN       207133564 U    3/2018
CN       109073757 A   12/2018

* cited by examiner

1100

```
┌─────────────────────────────────────────────────────────────────────┐
│ Manufacture a transmitter to include one or more light sources to   │
│ transmit light in a spatial distribution, with the density of light │
│ points greater in a first region of the spatial distribution than   │
│ in a second region of the spatial distribution.                     │
│                              1102                                    │
├─────────────────────────────────────────────────────────────────────┤
│ Decrease the density of light points for a region of the spatial    │
│ distribution as a distance between the center of the spatial        │
│ distribution and a center of the region increases.                  │
│                              1104                                    │
└─────────────────────────────────────────────────────────────────────┘
                                  │
                                  ▼
┌─────────────────────────────────────────────────────────────────────┐
│ Manufacture a receiver to receive reflections of the light to be    │
│ transmitted by the transmitter.                                     │
│                              1106                                    │
├─────────────────────────────────────────────────────────────────────┤
│ Manufacture a receiver sensor so that the center of the sensor is   │
│ to receive the portion of the reflections corresponding to the      │
│ center of the spatial distribution for reflections from objects a   │
│ determined depth from the system.                                   │
│                              1108                                    │
└─────────────────────────────────────────────────────────────────────┘
```

```
┌─────────────────────────────────────────────────────────────────────┐
│ Transmit a spatial distribution of light points using one or more   │
│ light sources.                                                      │
│                              1202                                    │
│ ┌─────────────────────────────────────────────────────────────────┐ │
│ │ Transmit a first region of the spatial distribution having a    │ │
│ │ density of light points greater than a second region of the     │ │
│ │ spatial distribution when a distance between the center of the  │ │
│ │ first region and the center of the spatial distribution is less │ │
│ │ than the distance between the center of the second region      │ │
│ │ and the center of the spatial distribution.                    │ │
│ │                            1204                                  │ │
│ └─────────────────────────────────────────────────────────────────┘ │
└─────────────────────────────────────────────────────────────────────┘
                                   │
                                   ▼
┌─────────────────────────────────────────────────────────────────────┐
│               Receive reflections of transmitted light.              │
│                              1206                                    │
│ ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐ │
│   Receive one or more reflections of the transmitted light points. │ │
│ │                            1208                                    │
│ └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘ │
└─────────────────────────────────────────────────────────────────────┘
```

FIG. 12

LIGHT DISTRIBUTION FOR ACTIVE DEPTH SYSTEMS

TECHNICAL FIELD

This disclosure relates generally to systems and methods for active depth systems, and specifically to the density of light distribution for active depth systems.

BACKGROUND OF RELATED ART

A device may determine distances of its surroundings using different depth finding systems. In determining the depth, the device may generate a depth map illustrating or otherwise indicating the depths of objects from the device by transmitting one or more wireless signals and measuring reflections of the wireless signals. One depth finding system is a structured light depth system.

For an active depth system, such as a structured light depth system, a known spatial distribution of light is transmitted (such as near-infrared or other frequency signals of the electromagnetic spectrum), and the reflections of the spatial distribution are measured and analyzed to determine depths of objects from the device. For structured light depth systems, a device uses triangulation in determining a displacement of the spatial distribution at a receiver. One problem with conventional structured light depth systems is that an aperture of the receiver through which the reflections pass may cause interference or otherwise limit the device's ability to identify portions of the distribution away from the distribution's center.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure relate to systems and methods for active depth systems. In some example implementations, an active depth system may include a receiver to receive reflections of transmitted light and a transmitter including one or more light sources to transmit light in a spatial distribution. The spatial distribution of transmitted light may include a first region of a first plurality of light points and a second region of a second plurality of light points. A first density of the first plurality of light points is greater than a second density of the second plurality of light points when a first distance between a center of the spatial distribution and a center of the first region is less than a second distance between the center of the spatial distribution and the center of the second region.

In another example, a method of performing active depth measurement is disclosed. The method includes receiving, by a receiver, reflections of transmitted light. The method also includes transmitting, by a transmitter including one or more light sources, light in a spatial distribution, the spatial distribution of transmitted light including a first region of a first plurality of light points and a second region of a second plurality of light points. A first density of the first plurality of light points is greater than a second density of the second plurality of light points when a first distance between a center of the spatial distribution and a center of the first region is less than a second distance between the center of the spatial distribution and the center of the second region.

In a further example, a non-transitory computer-readable medium is disclosed. The non-transitory computer-readable medium may store one or more programs containing instructions that, when executed by one or more processors of a device, cause the device to receive, by a receiver, reflections of the transmitted light. Execution of the instruction may further cause the device to transmit, by a transmitter including one or more light sources, light in a spatial distribution, the spatial distribution of transmitted light including a first region of a first plurality of light points and a second region of a second plurality of light points. A first density of the first plurality of light points is greater than a second density of the second plurality of light points when a first distance between a center of the spatial distribution and a center of the first region is less than a second distance between the center of the spatial distribution and the center of the second region.

In another example, an active depth system may include one or more processors. The active depth system may also include a memory coupled to the one or more processors and including instructions that, when executed by the one or more processors, cause the device to receive, by a receiver, reflections of the transmitted light and transmit, by a transmitter including one or more light sources, light in a spatial distribution, the spatial distribution of transmitted light including a first region of a first plurality of light points and a second region of a second plurality of light points. A first density of the first plurality of light points is greater than a second density of the second plurality of light points when a first distance between a center of the spatial distribution and a center of the first region is less than a second distance between the center of the spatial distribution and the center of the second region.

In a further example, an active depth system may include means for receiving reflections of transmitted light. The active depth system may also include means for transmitting light in a spatial distribution, the spatial distribution of transmitted light including a first region of a first plurality of light points and a second region of a second plurality of light points. A first density of the first plurality of light points is greater than a second density of the second plurality of light points when a first distance between a center of the spatial distribution and a center of the first region is less than a second distance between the center of the spatial distribution and the center of the second region.

BRIEF DESCRIPTION OF THE DRAWINGS

Aspects of the present disclosure are illustrated by way of example, and not by way of limitation, in the figures of the accompanying drawings and in which like reference numerals refer to similar elements.

FIG. 11 is a flow chart depicting an example operation for manufacturing an active depth system.

FIG. 12 is a flow chart depicting an example operation of an active depth system.

DETAILED DESCRIPTION

Figure 1:
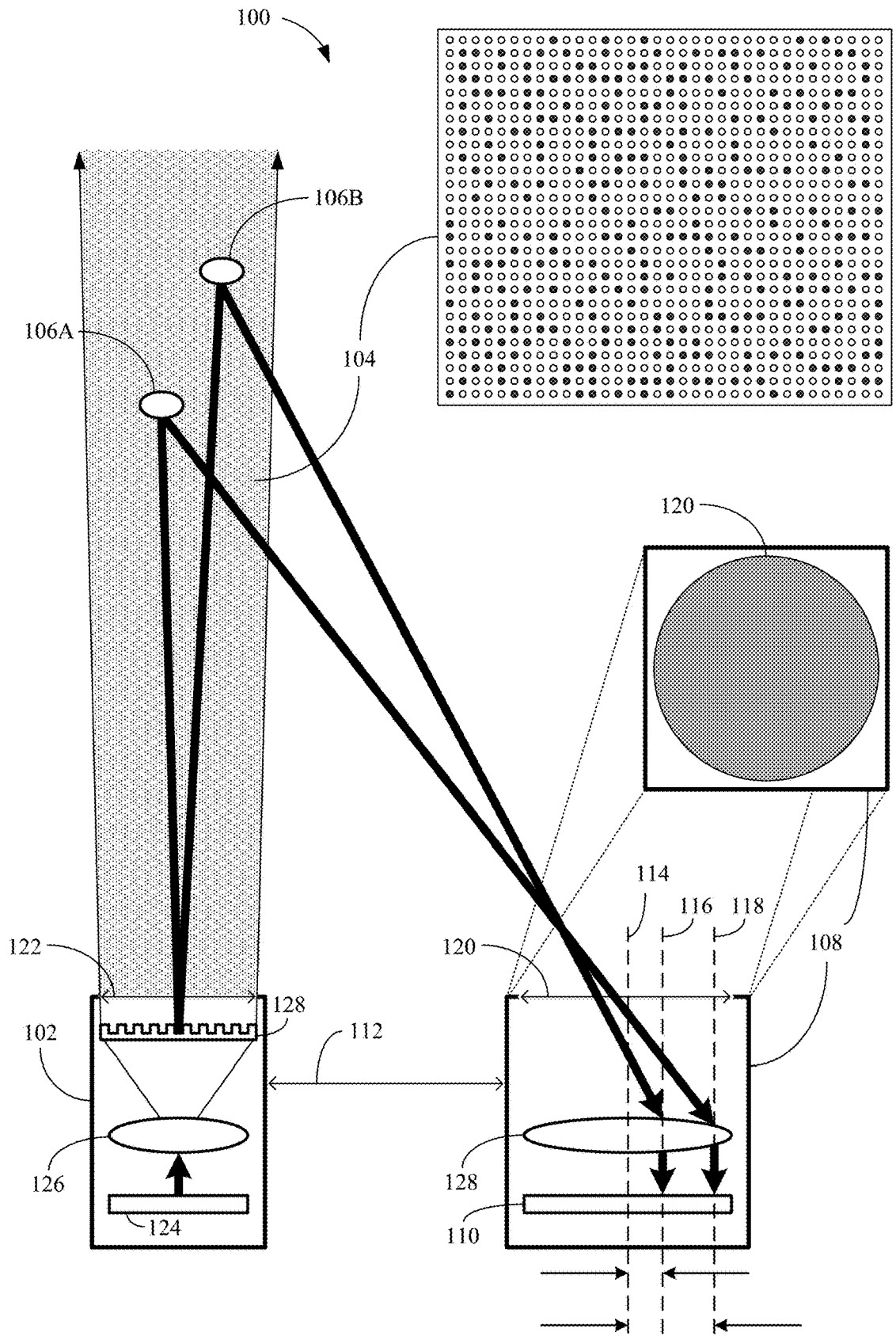
FIG. 1 is an example active depth system.

Aspects of the present disclosure may be used for active depth systems. An example active depth system, such as a structured light depth system, transmits or projects a spatial distribution of signals (such as light or other wavelength signals) onto a scene, and receives the reflections off of objects in the scene. The spatial distribution in the reflections is then analyzed to determine depths of objects in the scene. Characteristics of active depth systems place limitations on being able to analyze the distribution in the reflections. For example, the aperture size or shape for a receiver in structured light depth systems may cause interference in receiving some reflections.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to active depth systems, and may be included in or coupled to any suitable electronic device (such as security systems, smartphones, tablets, laptop computers, vehicles, drones, virtual reality devices, or other devices that may utilize depth sensing). While described below regarding a structured light depth system, aspects of the present disclosure may be applicable to other types of active depth systems that transmit light points in a spatial distribution. Further, while described below with respect to a device having or coupled to one active depth system, aspects of the present disclosure are applicable to devices having any number of active depth systems.

The term "device" is not limited to one or a specific number of physical objects (such as one smartphone, one controller, one processing system and so on). As used herein, a device may be any electronic device with one or more parts that may implement at least some portion of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, have one or more housings, be one or more objects integrated into another device, and may have movable or static components. While the below description and examples use the term "system"

to describe various aspects of this disclosure, the term "system" is not limited to a specific configuration, type, or number of objects.

FIG. 1 is an example active depth system 100. The below examples describe the active depth system 100 as a structured light depth system for illustrative purposes (including a device having or coupled to a structured light depth system). However, the present disclosure should not be limited to a structured light depth system. The active depth system 100 may be used to generate a depth map (not pictured) of a scene (with objects 106A and 106B at different depths in the scene). The active depth system 100 may include a transmitter 102 and a receiver 108. The transmitter 102 may be referred to as a "transmitter," "projector," "emitter," and so on, and should not be limited to a specific transmission component. Similarly, the receiver 108 may be referred to as a "detector," "sensor," "sensing element," "photodetector," and so on, and should not be limited to a specific receiving component.

The transmitter 102 may be configured to project a spatial distribution of light points 104 onto the scene (including objects 106A and 106B). In some example implementations, the transmitter 102 may include one or more light sources 124 (such as laser sources), a lens 126, and a light modulator 128. In some embodiments, the light modulator 128 includes one or more diffractive optical elements (DOEs) to diffract the emissions from one or more light sources 124 (which may be directed by the lens 126 to the light modulator 128) into additional emissions. The light modulator 128 may also adjust the intensity of the emissions. Additionally or alternatively, the lights sources 124 may be configured to adjust the intensity of the emissions.

In some other example implementations of the transmitter 102, a DOE may be coupled directly to a light source (without lens 126) and be configured to diffuse the emitted light from the light source into at least a portion of the spatial distribution 104. While the active depth system is described in the examples as using near-infrared (NIR) emissions from the transmitter, signals at other frequencies may be used, such as microwaves, other infrared, ultraviolet, and visible light. Further, lower frequency signals or higher frequency signals may be used, including radio frequencies, sound frequencies, and so on. The present disclosure should not be limited to a specific range of frequencies for the emitted signals.

The spatial distribution 104 may be a distribution of emitted light points that the transmitter projects onto a scene. For structured light depth systems, the spatial distribution may be fixed and unchanging. For example, a DOE may be manufactured so that the black spots in the spatial distribution 104 correspond to locations in the DOE that prevent light from the light source 124 being emitted by the transmitter 102. In this manner, the spatial distribution 104 may be known in analyzing any reflections received by the receiver 108. The transmitter 102 may transmit the light points in a spatial distribution through the aperture 122 of the transmitter 102 and onto the scene (including objects 106A and 106B). While the light points are illustrated as spots of focused light or spots of light with a specific dispersion, the light points may be any specific size, dimension, and configuration. For example, the light points may be lines, curves, rectangles, or formed into other shapes. Further, while the light points are illustrated as being aligned in lines and columns, the light points may be arranged in diagonal lines, curves, other shapes, or be arranged in another suitable manner.

The receiver 108 may include an aperture 120 through which reflections of the emitted light may pass, be directed by a lens 126 and hit a sensor 110. The sensor 110 may be configured to detect (or "sense"), from the scene, one or more reflections of the spatial distribution of light points. As illustrated, the transmitter 102 may be positioned on the same reference plane as the receiver 108, and the transmitter 102 and the receiver 108 may be separated by a distance 112 called the "baseline."

In some example implementations, the sensor 110 may include an array of photodiodes (such as avalanche photodiodes) to measure or sense the reflections. The array may be coupled to a complementary metal-oxide semiconductor sensor including a number of pixels or regions corresponding to the number of photodiodes in the array. The plurality of electrical impulses generated by the array may trigger the corresponding pixels or regions of the CMOS sensor to provide measurements of the reflections sensed by the array. Alternatively, the sensor 110 may be a photosensitive CMOS sensor to sense or measure reflections including the reflected codeword distribution. The CMOS sensor logically may be divided into groups of pixels (such as 4×4 groups) that correspond to a size of a bit of the spatial distribution 104, as described below in connection with FIG. 3. The group (which may also be of other sizes, including one pixel) is also referred to as a bit.

The reflections may include multiple reflections of the spatial distribution of light points from different objects or portions of the scene at different depths (such as objects 106A and 106B). Based on the baseline 112, displacement and distortion of the sensed light in spatial distribution 104, and intensities of the reflections, the active depth system 100 may be used to determine one or more depths and locations of objects (such as objects 106A and 106B) from the active depth system 100. In some example implementations, using triangulation based on the baseline and the distances, the active depth system 100 may be used to determine the differing distances between objects 106A and 106B. For example, if the portion of the spatial distribution 104 of the reflections from objects 106A and 106B received at sensor 110 are recognized or identified as the same, the distance between the location 116 where the light reflected from object 106B hits sensor 110 and the center 114 of sensor 110 is less than the distance between the location 118 where the light reflected from object 106A hits sensor 110 and the center 114 of sensor 110. A smaller distance may indicate that the object 106B is further from the transmitter 102 than object 106A. The calculations may further include determining displacement or distortion of the spatial distribution 104, as described below in connection with FIG. 3.

Although a number of separate components are illustrated in FIG. 1, one or more of the components may be implemented together or include additional functionality. All described components may also not be required for an active depth system 100, or the functionality of components may be separated into separate components. Therefore, the present disclosure should not be limited to the example active depth system 100.

Figure 2:
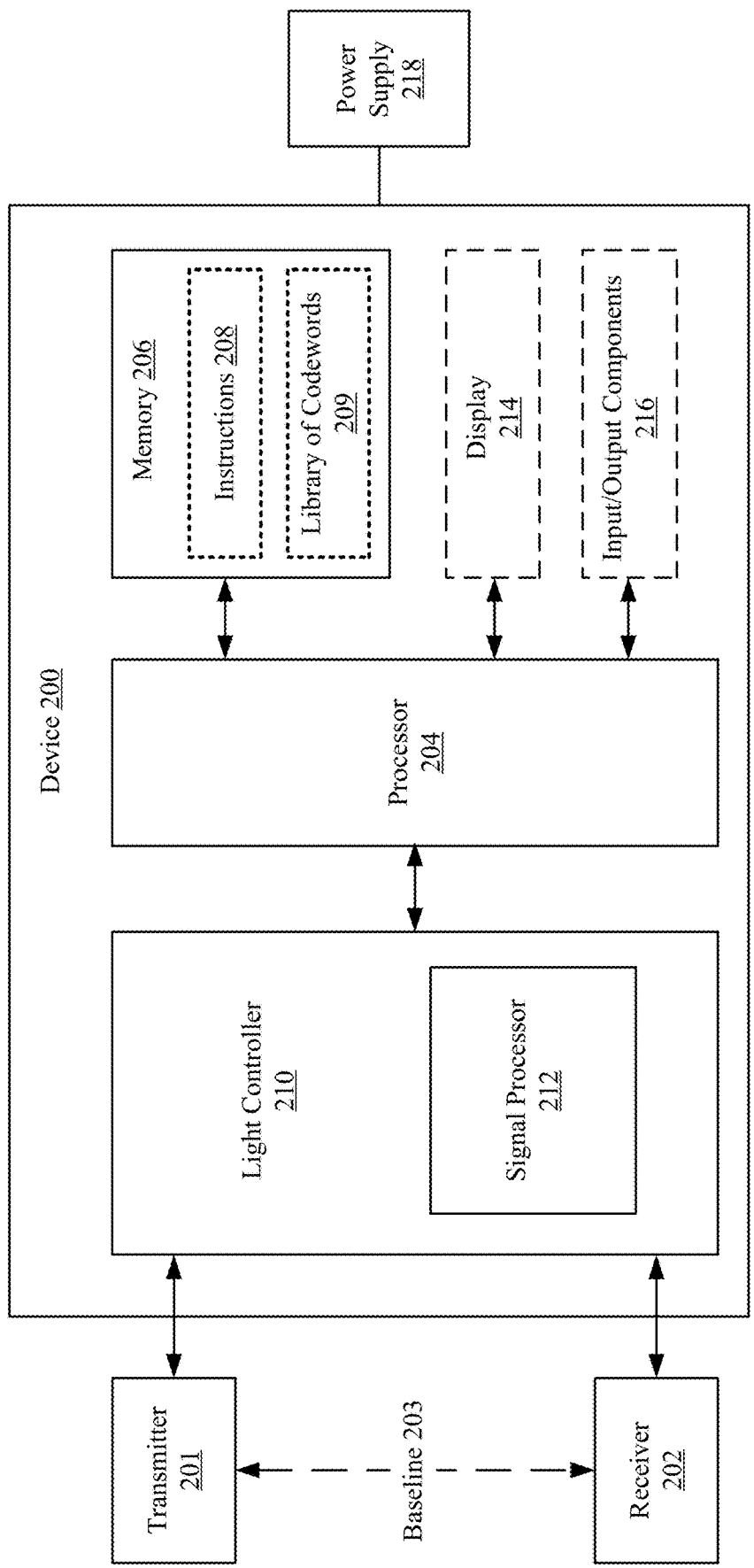
FIG. 2 is a block diagram of an example device including an active depth system.

FIG. 2 is a block diagram of an example device 200 including an active depth system. In some other examples, the active depth system may be the active depth system 100 in FIG. 1, and the active depth system may be coupled to the device 200. The example device 200 may include or be coupled to a transmitter 201 (such as transmitter 102 in FIG. 1), a receiver 202 (such as receiver 108 in FIG. 1) separated from the transmitter by a baseline 203, a processor 204, a memory 206 storing instructions 208, and a light controller 210 (which may include one or more signal processors 212). The device 200 may optionally include (or be coupled to) a display 214 and a number of input/output (I/O) components 216. The device 200 may include additional features or components not shown. For example, a wireless interface, which may include a number of transceivers and a baseband processor, may be included for a wireless communication device. The transmitter 201 and the receiver 202 may be part of an active depth system (such as active depth system 100 in FIG. 1) controller by the light controller 210 and/or the processor 204. The device 200 may include or be coupled to additional active depth systems or a different configuration for the active depth system. For example, the device 200 may include or be coupled to additional receivers (not shown) for calculating distances and locations of objects in a scene). The disclosure should not be limited to any specific examples or illustrations, including the example device 200.

The memory 206 may be a non-transient or non-transitory computer readable medium storing computer-executable instructions 208 to perform all or a portion of one or more operations described in this disclosure. The memory 206 may also store a library of codewords 209. A codeword may be a predefined portion of the spatial distribution 104, e.g., as described regarding FIG. 3 below. In identifying portions of the spatial distribution 104, the device 200 may attempt to identify one or more codewords from the library of codewords 209 in the received reflections from receiver 202. The device 200 may also include a power supply 218, which may be coupled to or integrated into the device 200.

The processor 204 may be one or more suitable processors capable of executing scripts or instructions of one or more software programs (such as instructions 208) stored within the memory 206. In some aspects, the processor 204 may be one or more general purpose processors that execute instructions 208 to cause the device 200 to perform any number of functions or operations. In additional or alternative aspects, the processor 204 may include integrated circuits or other hardware to perform functions or operations without the use of software. While shown to be coupled to each other via the processor 204 in the example of FIG. 2, the processor 204, the memory 206, the light controller 210, the optional display 214, and the optional I/O components 216 may be coupled to one another in various arrangements. For example, the processor 204, the memory 206, the light controller 210, the optional display 214, and/or the optional I/O components 216 may be coupled to each other via one or more local buses (not shown for simplicity).

The display 214 may be any suitable display or screen allowing for user interaction and/or to present items (such as a depth map or a preview image of the scene) for viewing by a user. In some aspects, the display 214 may be a touch-sensitive display. The I/O components 216 may be or include any suitable mechanism, interface, or device to receive input (such as commands) from the user and to provide output to the user. For example, the I/O components 216 may include (but are not limited to) a graphical user interface, keyboard, mouse, microphone and speakers, squeezable bezel or border of the device 200, physical buttons located on device 200, and so on. The display 214 and/or the I/O components 216 may provide a preview image or depth map of the scene to a user and/or receive a user input for adjusting one or more settings of the device 200 (such as adjusting the intensity of the emissions by transmitter 201, adjusting the size of the codewords used for an active depth system, and so on).

The light controller 210 may include a signal processor 212, which may be one or more processors to process measurements provided by the receiver 202 and/or control the transmitter 201 (such as to control the intensity of the emission). In some aspects, the signal processor 212 may execute instructions from a memory (such as instructions 208 from the memory 206 or instructions stored in a separate memory coupled to the image signal processor 212). In other aspects, the signal processor 212 may include specific hardware for operation. The signal processor 212 may alternatively or additionally include a combination of specific hardware and the ability to execute software instructions.

Figure 3:
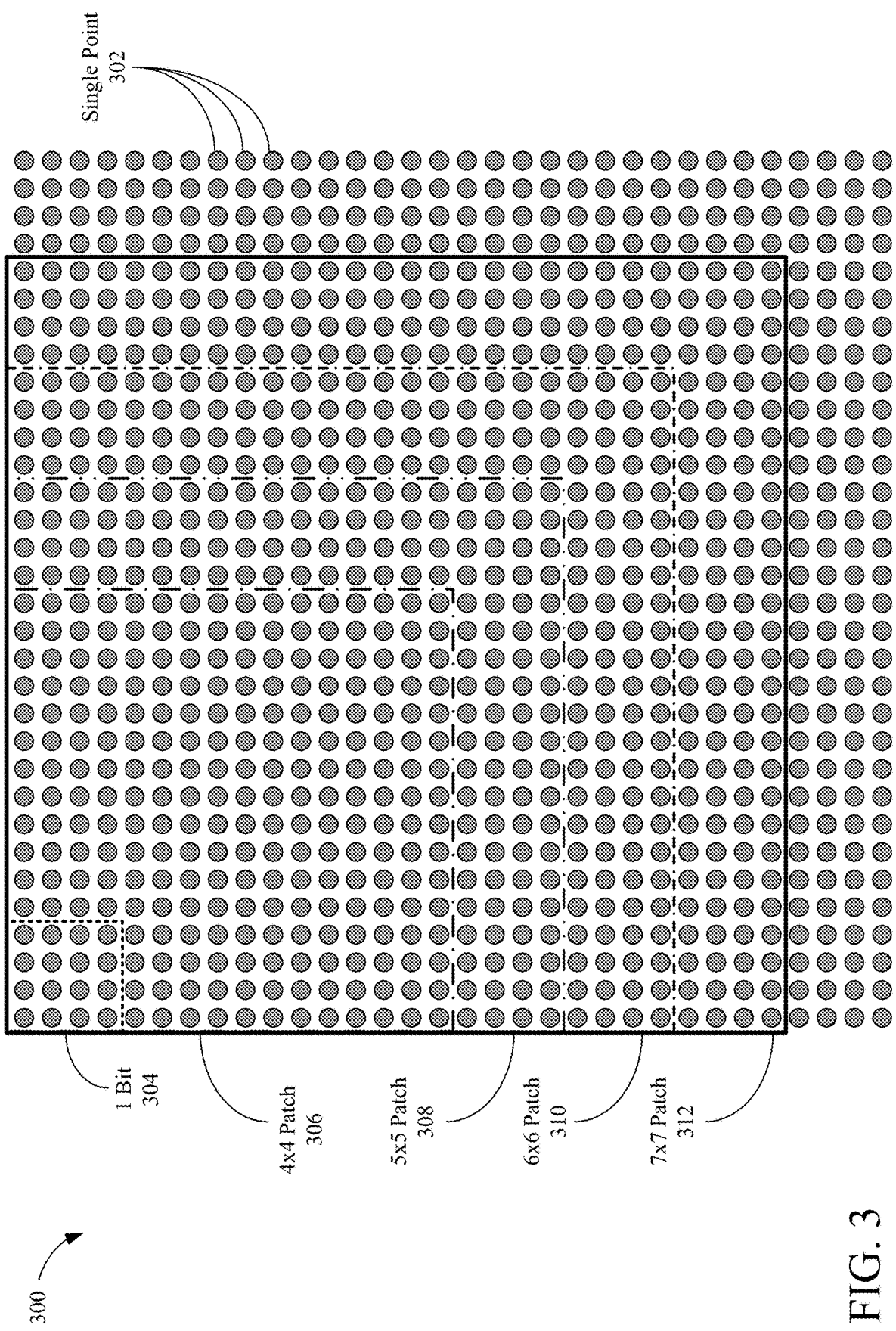
FIG. 3 is a depiction of a portion of an example spatial distribution of light points for an active depth system.

FIG. 3 is a depiction of a portion 300 of a conventional spatial distribution for an active depth system. Portion 300 may be an example portion of the spatial distribution 104 in FIG. 1. The distribution comprises a plurality of single light emissions (called "points") 302 that may be considered on or off (1 or 0, respectively). The points 302 are logically grouped 4×4 into a bit (such as bit 304). Patches of bits may be logically grouped into portions of the spatial distribution called codewords. For example, a device 200 may use codewords the size a 4-bit×4-bit patch (such as 4×4 patch 306). Additional codeword sizes may include a 5×5 patch (such as 5×5 patch 308), a 6×6 patch (such as 6×6 patch 310), and a 7×7 patch (such as 7×7 patch 312). Using larger size codewords provides lower resolution than using smaller codewords, but more points in the codeword exist for correctly identifying the codeword (a smaller codeword may be more difficult to identify in the reflections).

The codeword distribution is known by the active depth system 100 in FIG. 1. For example, the codeword distribution may be hardcoded on the active depth system 100 (e.g., at the transmitter 102) so that the same distribution is always projected by the active depth system 100. Referring to FIG. 2, the device 200 may store a library of codewords 209, which may include the possible distribution of light points for the different size codewords throughout all locations of the codeword distribution. For example, the library of codewords 209 may include all codewords (including codewords of different sizes/number of light points) occurring throughout the codeword distribution. When analyzing the reflections, a device uses one size of codewords for the spatial distribution (such as using only 4×4 size codewords).

In conventional structured light depth systems, the light points of the spatial distribution are uniformly dispersed (such as in portion 300). In this manner, the space between neighboring points in a first portion of the spatial distribution is the same size as the space between neighboring points in a second portion of the spatial distribution. However, there may be more difficulty in using the edges of a spatial distribution as compared to the center of a spatial distribution when determining depths.

The transmitter 102 and the receiver 108 may be manufactured or oriented so that the apertures 122 and 120 are along the same plane. As a result, the center of the spatial distribution 104 from the transmitter 102 may not be reflected onto the center of the sensor 110 when reflecting the light off of a flat object parallel to the baseline 112. Further, objects typically are not perfectly flat or parallel to the baseline, which may cause the angle of the reflection approaching the receiver 108 to be more severe than if the objects are flat and parallel to the baseline. As a result, the aperture of a receiver (such as aperture 120 in FIG. 1) may block portions of the reflected spatial distribution of light points. The interference may be most pronounced at the edges of the spatial distribution, as the edge of the emitted light may approach the receiver 108 outside the aperture. In one example, interference may be more pronounced for reflections from object 106A than for reflections from object 106B since the angle of arrival of the reflections to the aperture 120 is less than for the reflections from object 106A. The effective aperture (the appearance of the aperture based on the angle of arrival) may be smaller for reflections from object 106A than for reflections from object 106B. For example, if the perspective or origin of the reflections is off-center from a field of view of the receiver 108, the aperture 120 may appear smaller from the perspective than from a perspective that is centered in the field of view of the receiver 108.

Figure 4:
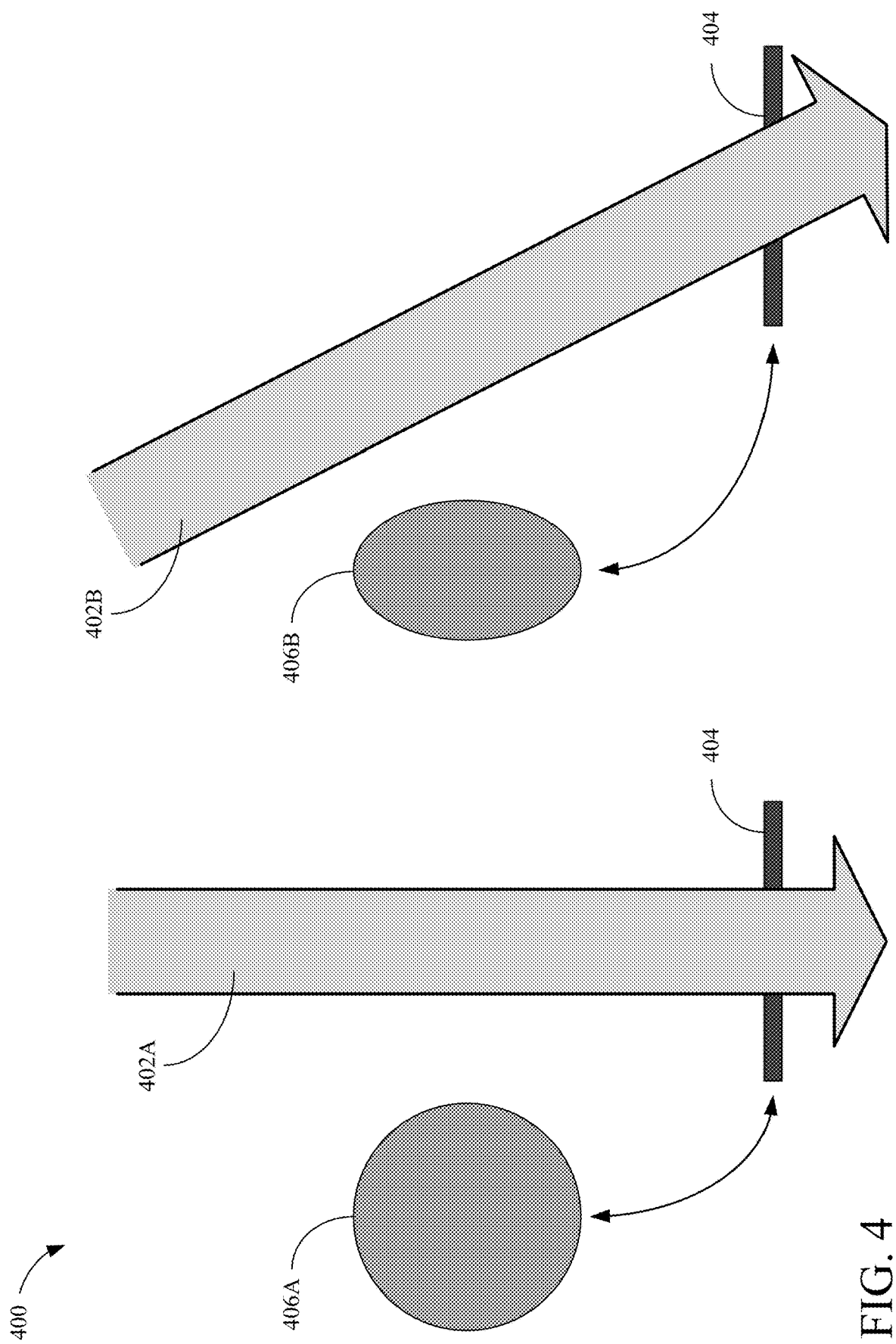
FIG. 4 is a depiction of the effective aperture of a receiver for an active depth system based on the angle of the reflections passing through the aperture.

FIG. 4 is a depiction 400 of the effective aperture of a receiver for an active depth system based on the angle of the reflections passing through the aperture 404. The aperture 404 may be an example of the aperture 120 in FIG. 1, which may have a circular shape. The reflections 402A approach and pass though the aperture 404 at approximately 90 degrees (perpendicular) to the aperture 404, which may be considered the "optical axis." The reflections 402B approach and pass through the aperture 404 at an angle less than 90 degrees to the aperture 404 (off the "optical axis"). As a result, the effective aperture 406A for the reflections 402A appears larger than the effective aperture 406B for the reflections 402B. For example, the effective aperture 406B may be compressed along the horizontal dimension as compared to the effective aperture 406A as a result of the angles the reflections pass through the aperture 404. The effective aperture may be compressed in a direction corresponding to the perspective of the reflections, and the severity of compression may be related to the angle of the reflections away from the optical axis. A smaller/compressed effective aperture may cause portions of the reflections for one or more edges of the spatial distribution to not be correctly sensed by the receiver sensor or portions of the spatial distribution along one or more edges to not be correctly identified when analyzing the sensed reflections. This may be especially true for the corners of a spatial distribution.

The effective aperture corresponds to the angular diffraction limit for the reflections. The angular diffraction limit is defined as depicted in equation (1) below:

$$\theta = \frac{1.22\lambda}{D} \quad (1)$$

where θ is the diffraction limit, λ is the wavelength of the reflections, and D is the diameter size of the effective aperture corresponding to the perspective of the reflections passing through the aperture.

To compensate for interference caused by different effective apertures, conventional structured light depth systems (which include uniform spacing and density of points and bits) are designed for worst case scenarios. For example, larger size codewords are used to compensate for interference that may occur for the corners of the spatial distribution. As a result, the corners of a spatial distribution may be identified from the reflections. However, there is less interference identifying the center of the spatial distribution in the reflections than for identifying the corners of the spatial distribution. Use of larger codewords may therefore provide worse resolution than possible for the center of the spatial distribution (such as if using smaller size codewords).

In some example implementations, an active depth system may project a spatial distribution with varying densities of light points for different regions of the spatial distribution. In one example, the center of the spatial distribution may have a higher density of light points than one or more edges of the spatial distribution. The density of points of the spatial distribution may decrease as the distance from the center of the spatial distribution increases. For example, points and bits along an edge of the spatial distribution may be spaced further from one another than points and bits at a center of the spatial distribution.

In varying the density of light points in the spatial distribution, a transmitter of the active depth system may include one or more DOEs manufactured to cause the points of the spatial distribution to have non-uniform spacing. Additionally or alternatively, the light sources of a transmitter may be spaced to cause varying densities of light points, the transmitter may be configured to turn on and off light sources to control the density of light points, or other suitable means for varying the density of spatial distribution may be implemented.

In some example implementations of the density of light points in the spatial distribution decreasing as the distance from the center of the spatial distribution increases, the density may be the same along a boundary around the center of the spatial distribution. In one example, the density of the spatial distribution along a circle or ellipse centered at the center of the spatial distribution may be the same. In another example, the density of the spatial distribution along a square or rectangle centered at the center of the spatial distribution may be the same. Other suitable boundaries may exist for the density being the same.

Figure 5:
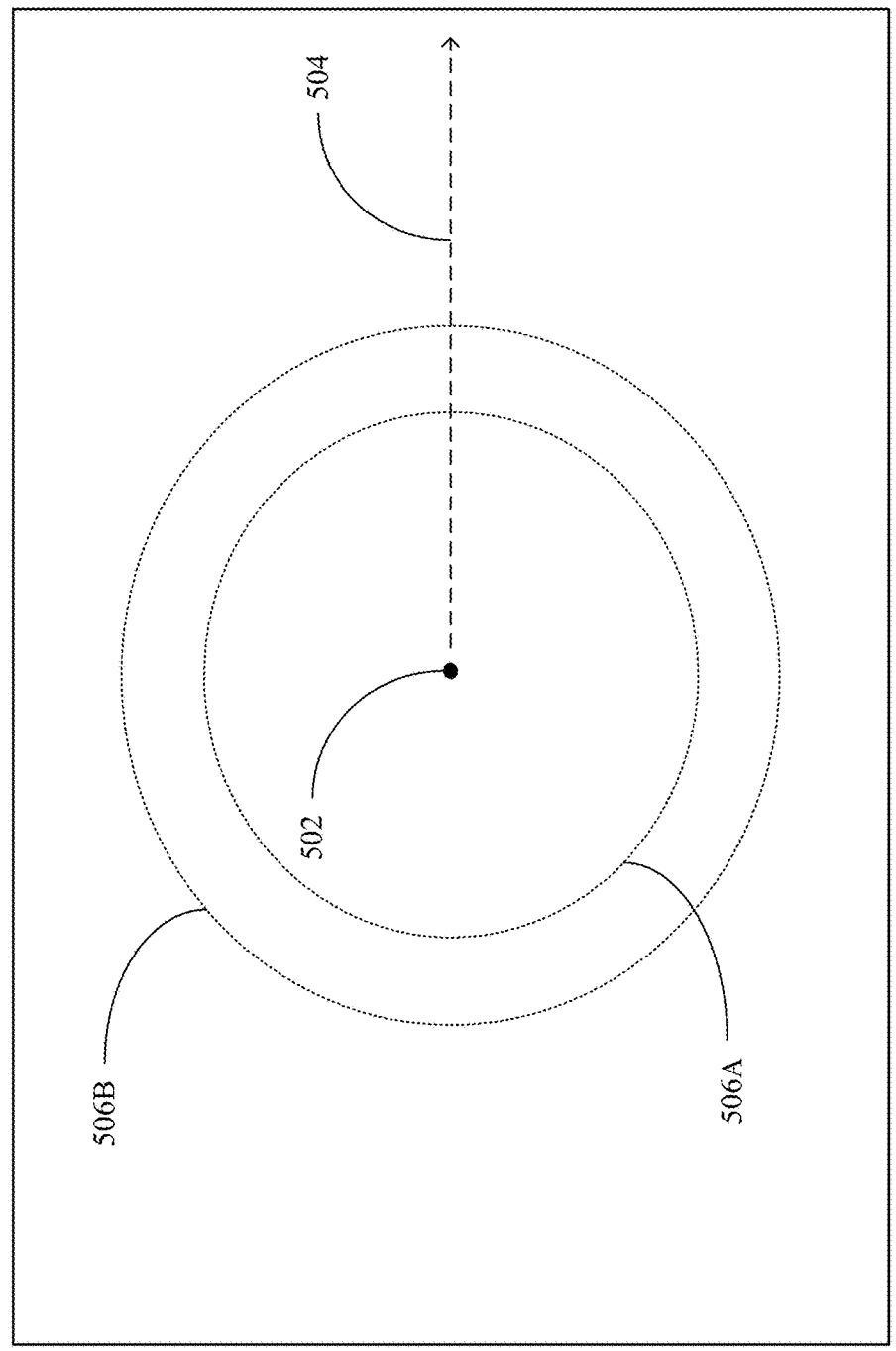
FIG. 5 is a depiction of a density of light points of the spatial distribution along a circle or ellipse around the center of the spatial distribution decreasing as the distance of the boundary from the center increases.

FIG. 5 is a depiction of a density of light points of the spatial distribution along a circle or ellipse around the center 502 of the spatial distribution 500 decreasing as the distance 504 of the boundary from the center increases. The density of light points of the spatial distribution 500 along a circle or ellipse (such as circles 506A and 506B) may be the same. As the distance 504 increases, the density along the circle or ellipse may decrease. For example, the density of light points along circle 506A may be greater than the density of light points along circle 506B.

Any suitable rate of decrease in density of light points as distance 504 increases may be used. For example, the rate of decrease in density may be non-linear, linear, stepwise, or any other suitable rate as the distance 504 from the center 502 of the spatial distribution 500 increases. In some example implementations, the angular diffraction limit (such as defined in equation 1) may be used to attempt to optimize the rate of decrease to balance increases in resolution with possible interference by the effective aperture for different portions of the spatial distribution. In this manner, the rate of decrease in density may be non-linear.

Figure 6A:
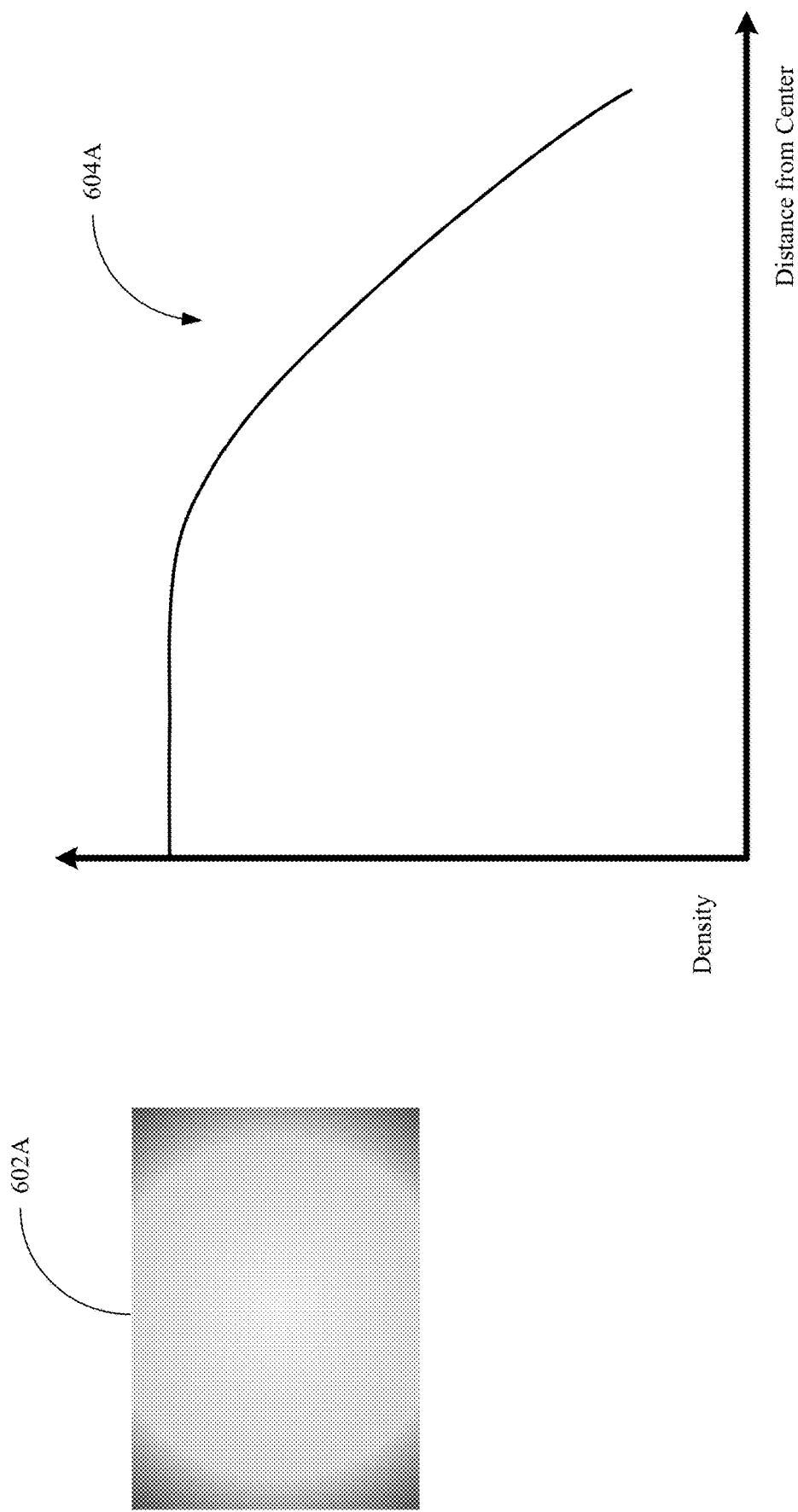
FIG. 6A is depiction of the density of light points of the spatial distribution in FIG. 5 decreasing in a non-linear manner.

FIG. 6A is a depiction of the density of light points of the spatial distribution 500 in FIG. 5 decreasing in a non-linear manner. The density may correspond to the distance from the center as depicted in graph 604A. 602A illustrates the density of the spatial distribution corresponding to graph 604A, in which lighter portions correspond to denser portions of light points of the spatial distribution 500 as compared to darker portions. As shown in 602A, the density at the center of the spatial distribution is greater than the density at the corners of the spatial distribution, and the density decreases non-linearly as the distance from the center increases (corresponding to graph 604A).

Figure 6B:
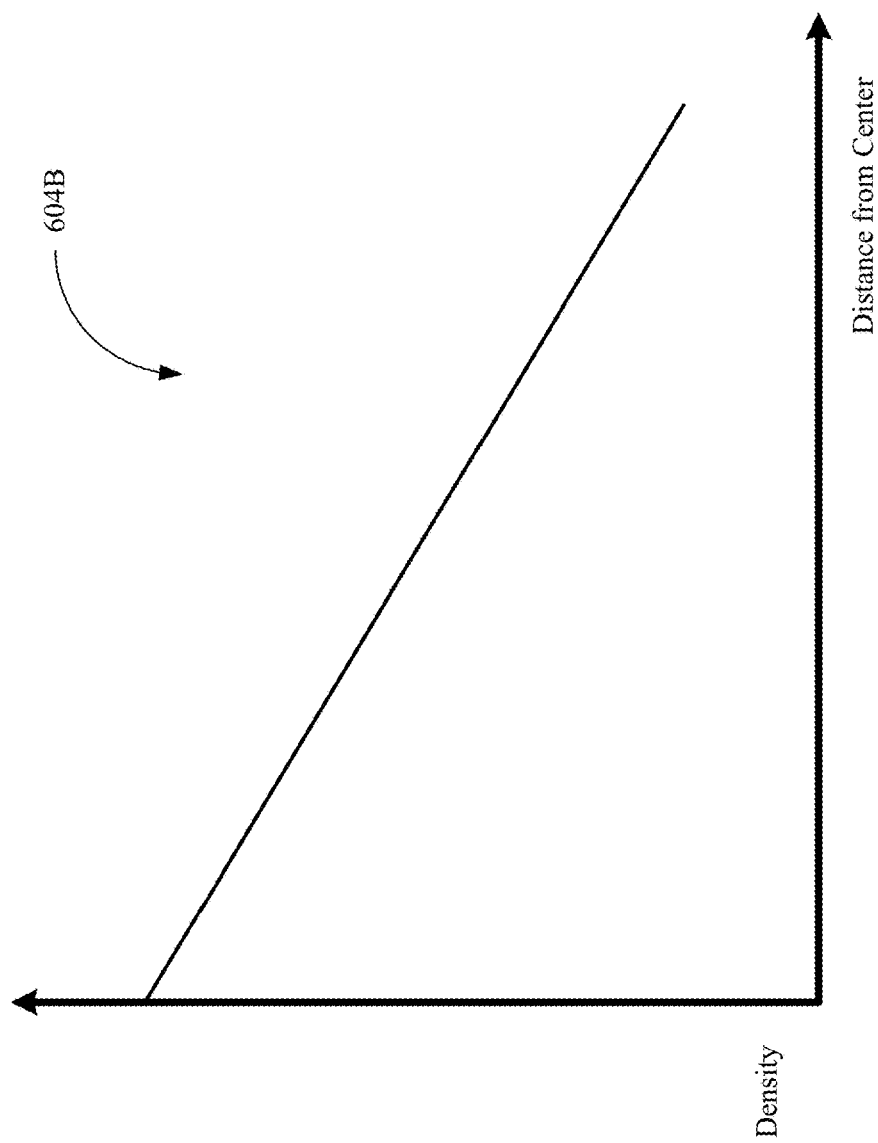
FIG. 6B is depiction of the density of light points of the spatial distribution in FIG. 5 decreasing in a linear manner.
Figure 6B:
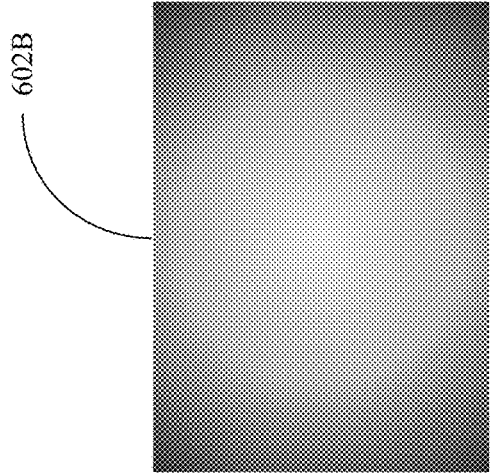

In some other example implementations, the rate of decrease in density may be linear as the distance from the center of the spatial distribution increases. FIG. 6B is a depiction of the density of light points of the spatial distribution 500 in FIG. 5 decreasing in a linear manner. The density may correspond to the distance from the center as depicted in graph 604B. 602B illustrates the density of the spatial distribution corresponding to graph 604B, in which lighter portions correspond to denser portions of light points of the spatial distribution 500 as compared to darker portions. As shown in 602B, the density at the center of the spatial distribution is greater than the density at the corners of the spatial distribution, and the density decreases linearly as the distance from the center increases (corresponding to graph 604B).

Figure 6C:
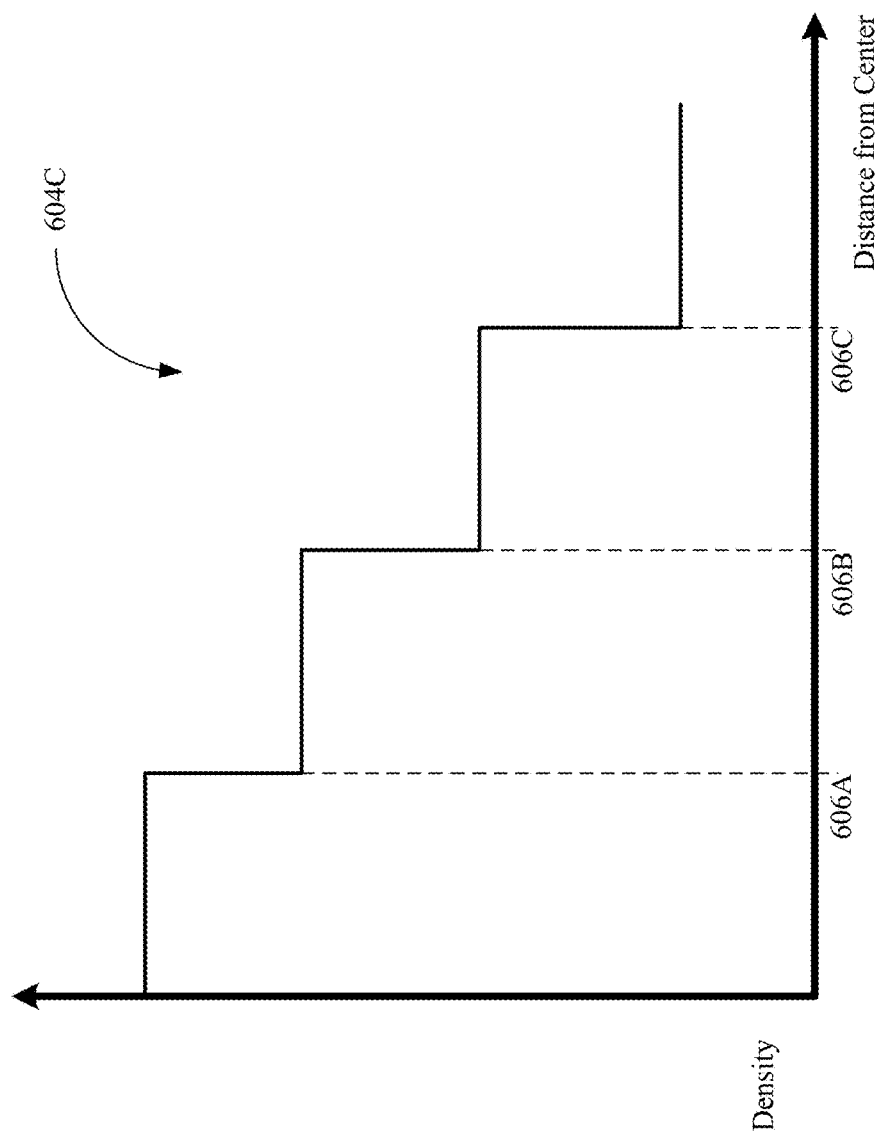
FIG. 6C is depiction of the density of light points of the spatial distribution in FIG. 5 decreasing in a stepwise manner.
Figure 6C:
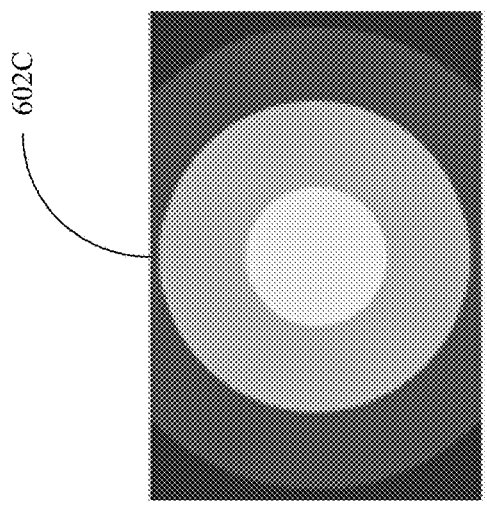

In some further example implementations, the rate of decrease in density may be stepwise as the distance from the center of the spatial distribution increases. For example, the density of the spatial distribution may be the same for a first range of distance from the center of the spatial distribution, the density may be the same for a second range of distance from the center of the spatial distribution, and so on. FIG. 6C is a depiction of the density of light points of the spatial distribution 500 in FIG. 5 decreasing in a stepwise manner. The density may correspond to the distance from the center as depicted in graph 604C. 602C illustrates the density of the spatial distribution corresponding to graph 604C, in which lighter portions correspond to denser portions of light points of the spatial distribution 500 as compared to darker portions. As shown in 602C, the density at the center of the spatial distribution is greater than the density at the corners of the spatial distribution, and the density decreases in a stepwise manner as the distance from the center increases (corresponding to graph 604C). For example, a first density of light points of the spatial distribution for a range from the center to distance 606A may be the same, a second density for a range from the distance 606A to distance 606B may be the same and less than the first density, a third density for a range from the distance 606B to distance 606C may be the same and less than the first density and the second density, and a fourth density for a range from the distance 606C and greater may be the same and less than the first density, second density, and third density.

In some example implementations, a shape of the boundary around the center of the spatial distribution along which the density of the light points is consistent (such as a circle or ellipse in FIG. 5) may correspond to the shape of the aperture (such as aperture 120 in FIG. 1). The aperture may be other than a circle or ellipse, such as a square or rectangle, and the present disclosure should not be limited to specific aperture shapes. In some further example implementations, the shape of the boundary around the center of the spatial distribution may correspond to the outline of the spatial distribution. For example, if the outline of the spatial distribution is a square or rectangle (such as spatial distribution 104 in FIG. 1), the boundary shape around the center of the spatial distribution may be a square or rectangle.

Figure 7:
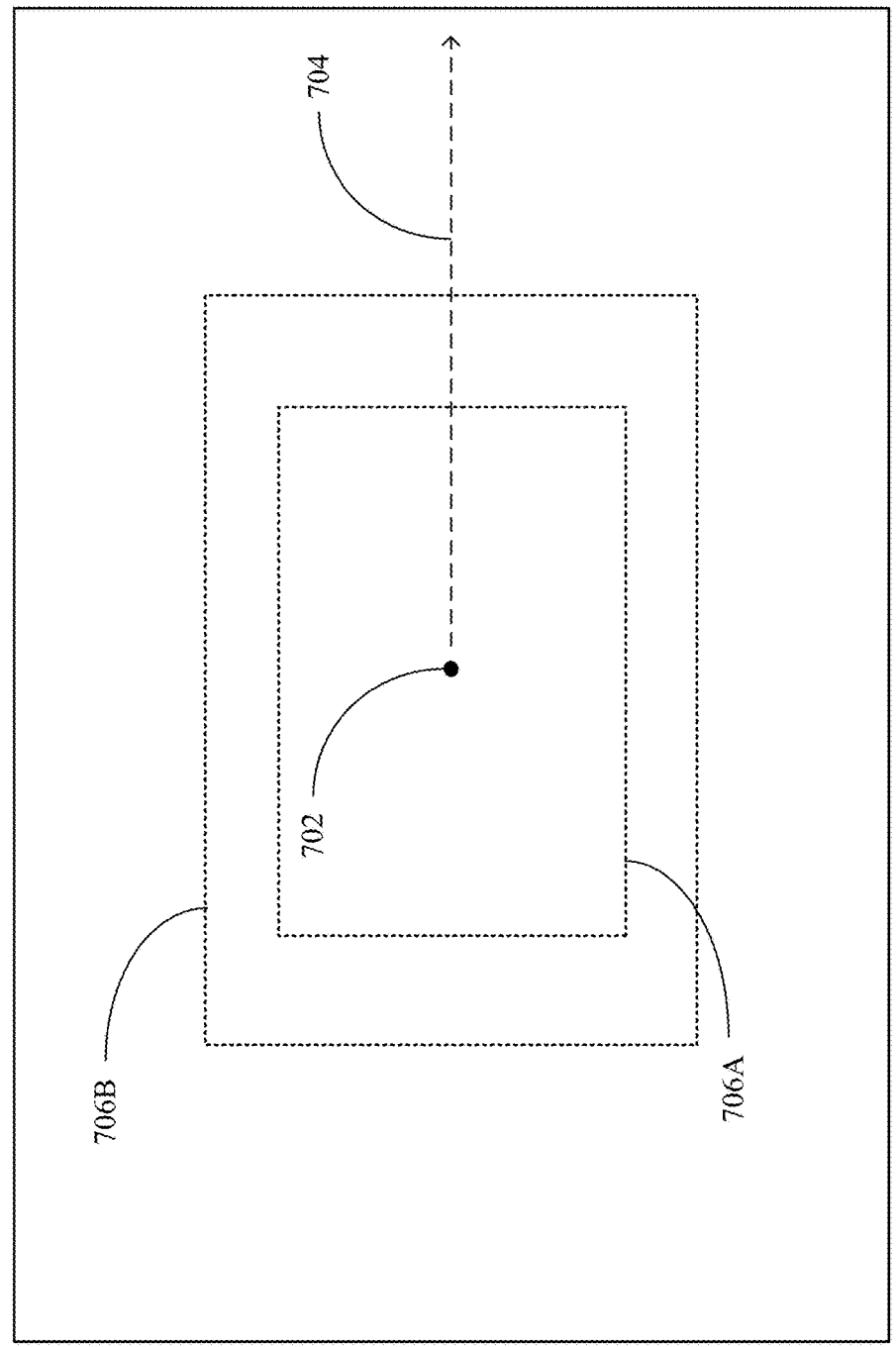
FIG. 7 is a depiction of a density of light points of the spatial distribution along a rectangle or square around the center of the spatial distribution decreasing as the distance of the boundary from the center increases.

Other suitable boundary shapes around the center of the spatial distribution may be used, and the present disclosure should not be limited to specific shapes. FIG. 7 is a depiction of a density of light points of the spatial distribution along a square or rectangle boundary around the center 702 of the spatial distribution 700 decreasing as the distance 704 of the boundary from the center increases. The density of light points along a square or rectangle boundary (such as rectangles 706A and 706B) may be the same. As the distance 704 increases, the density of light points along the square or rectangle boundary may decrease. For example, the density of light points along rectangle 706A may be greater than the density of light points along rectangle 706B.

Figure 8A:
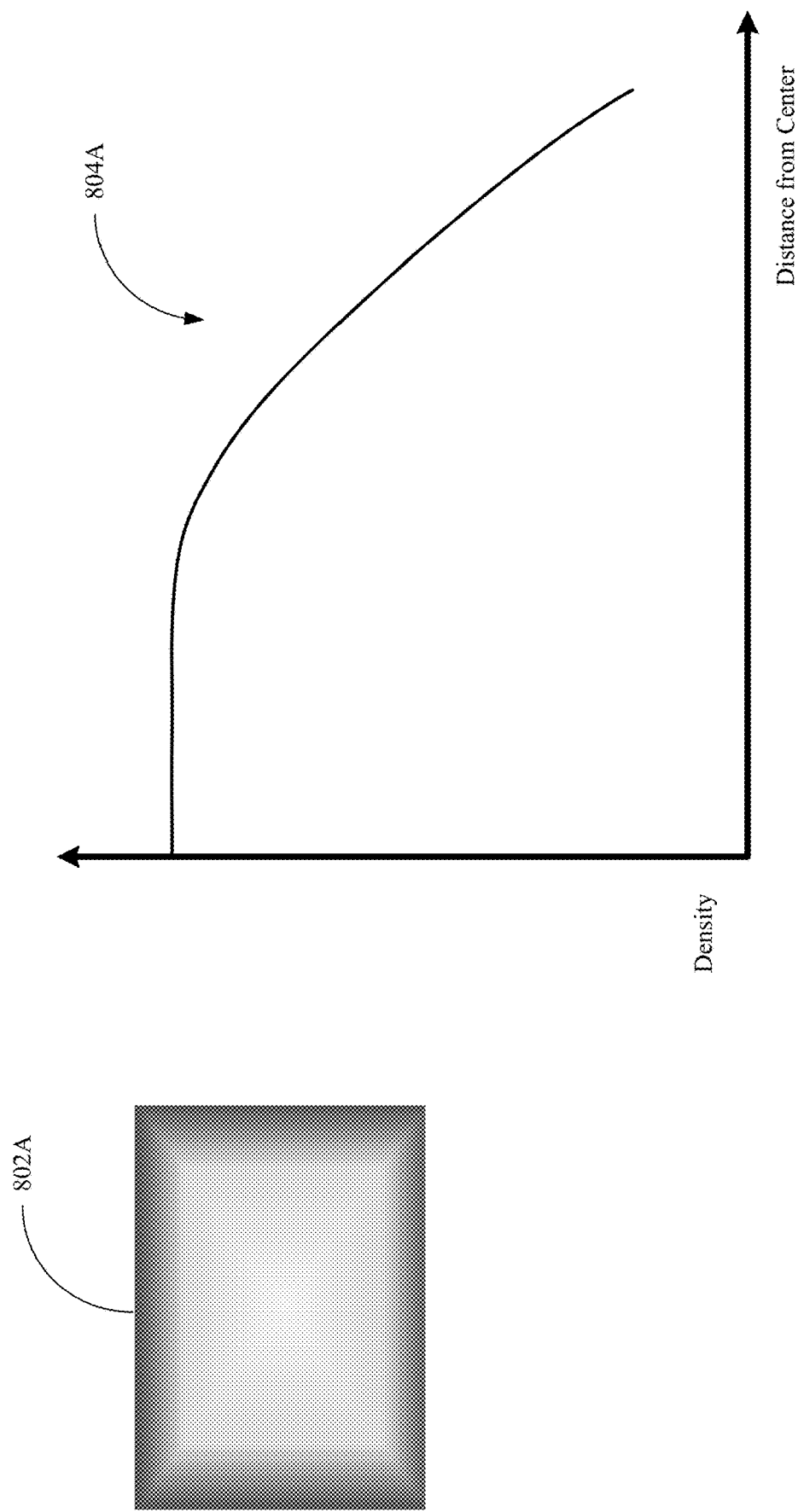
FIG. 8A is depiction of the density of light points of the spatial distribution in FIG. 7 decreasing in a non-linear manner.

As described above regarding the boundary shape around the center of the spatial distribution being a circle or ellipse, the rate of decrease in density may be non-linear, linear, stepwise, or any other suitable rate as the distance 704 from the center 702 of the spatial distribution 700 increases. FIG. 8A is a depiction of the density of light points of the spatial distribution 700 in FIG. 7 decreasing in a non-linear manner. The density of light points may correspond to the distance from the center as depicted in graph 804A. 802A illustrates the density of the spatial distribution corresponding to graph 804A, in which lighter portions correspond to denser portions of light points as compared to darker portions. As shown in 802A, the density at the center of the spatial distribution is greater than the density at the corners of the spatial distribution, and the density decreases non-linearly as the distance from the center increases (corresponding to graph 804A).

Figure 8B:
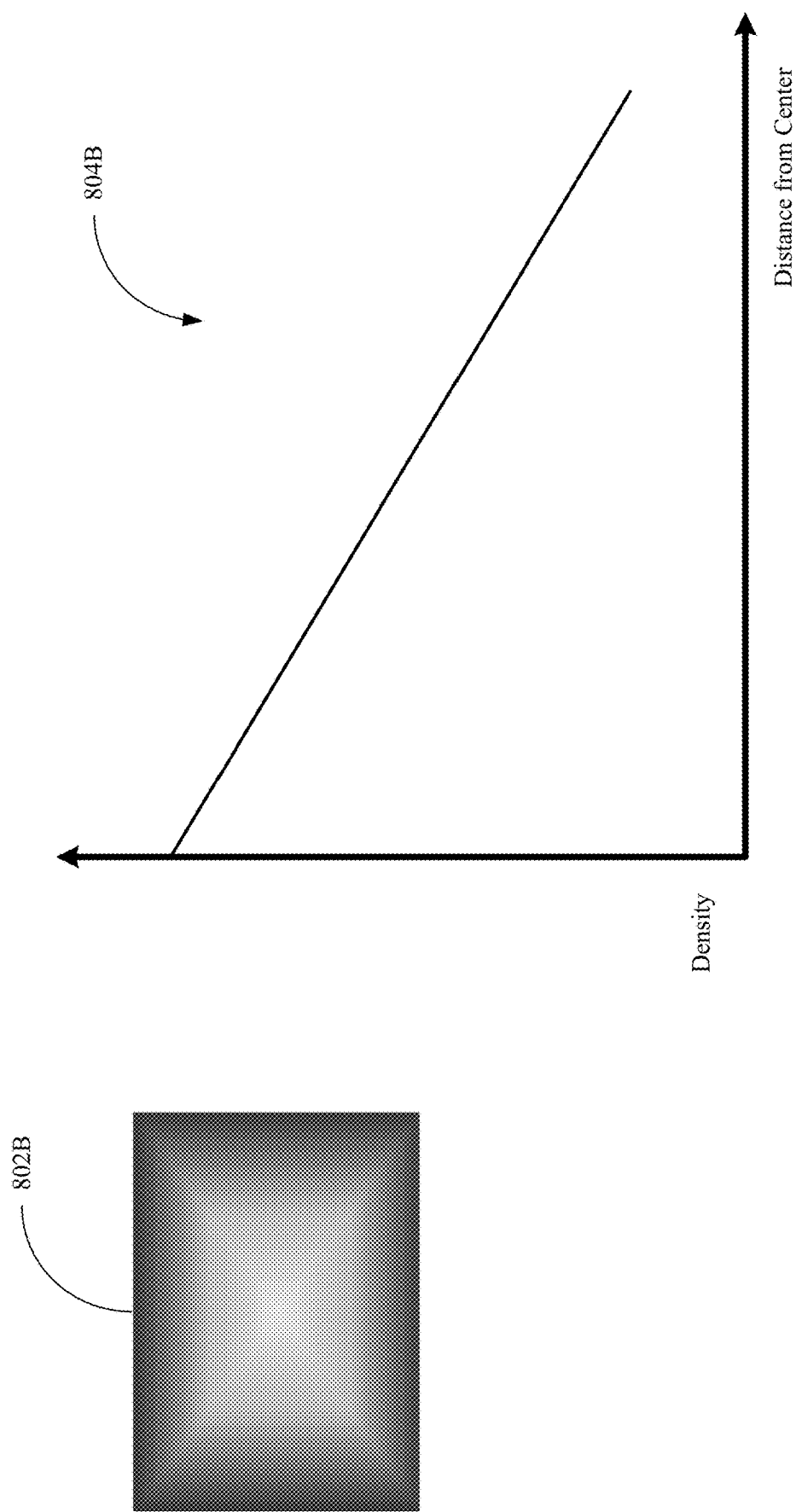
FIG. 8B is depiction of the density of light points of the spatial distribution in FIG. 7 decreasing in a linear manner.

FIG. 8B is a depiction of the density of light points of the spatial distribution 700 in FIG. 7 decreasing in a linear manner. The density may correspond to the distance from the center as depicted in graph 804B. 802B illustrates the density of the spatial distribution corresponding to graph 804B, in which lighter portions correspond to denser portions of light points as compared to darker portions. As shown in 802B, the density at the center of the spatial distribution is greater than the density at the corners of the spatial distribution, and the density decreases linearly as the distance from the center increases (corresponding to graph 804B).

Figure 8C:
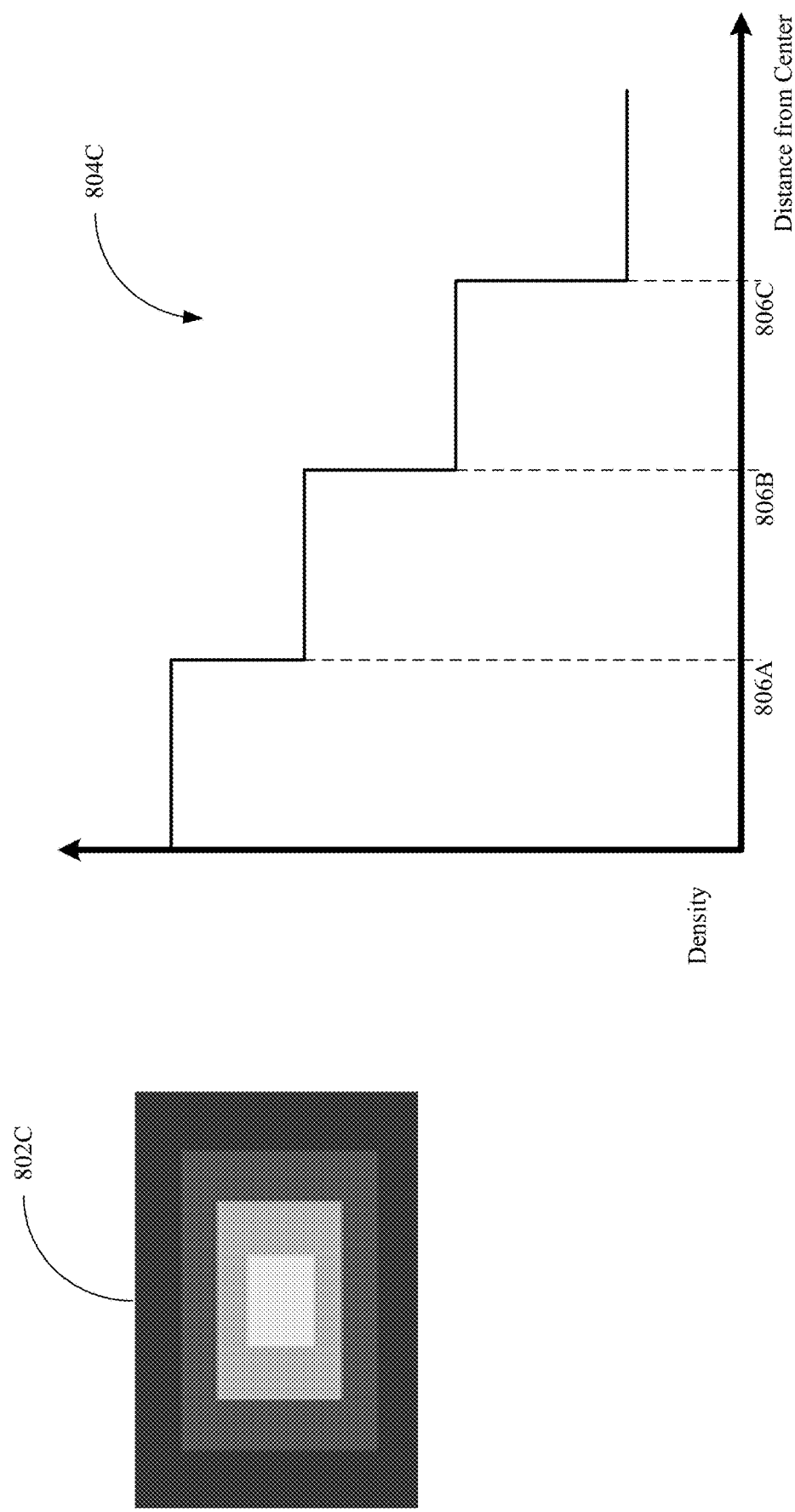
FIG. 8C is depiction of the density of light points of the spatial distribution in FIG. 7 decreasing in a stepwise manner.

FIG. 8C is depiction of the density of light points of the spatial distribution 700 in FIG. 7 decreasing in a stepwise manner. The density of light points may correspond to the distance from the center as depicted in graph 804C. 802C illustrates the density of the spatial distribution corresponding to graph 804C, in which lighter portions correspond to denser portions of light points as compared to darker portions. As shown in 802C, the density at the center of the spatial distribution is greater than the density at the corners of the spatial distribution, and the density decreases in a stepwise manner as the distance from the center increases (corresponding to graph 804C). For example, a first density of light points for a range from the center to distance 806A may be the same, a second density for a range from the distance 806A to distance 806B may be the same and less than the first density, a third density for a range from the distance 806B to distance 806C may be the same and less than the first density and the second density, and a fourth density for a range from the distance 806C and greater may be the same, with the density being less than the first density, second density, and third density.

Other boundary shapes around the center of the spatial distribution may be used, and the shape may not correspond to the outline of the spatial distribution or the shape of the aperture. The present disclosure should not be limited to specific shapes in outlining a same density of light points of the spatial distribution.

For a spatial distribution with a varying density of points, an N×N codeword (where N is a positive integer, such as 4×4, 5×5, and so on) may be of different sizes in different regions of the spatial distribution. For example, as the points and bits are dispersed further apart from one another as the distance from the center of the spatial distribution increases, a 4×4 codeword may be smaller in size at the center of the spatial distribution than the same codeword toward the edges of the spatial distribution. In some example implementations, while the size of an N×N codeword may change depending on the distance from the center of the spatial distribution, the bits of the spatial distribution may be arranged so that the aspect ratio of the N×N codeword remains the same.

Figure 9:
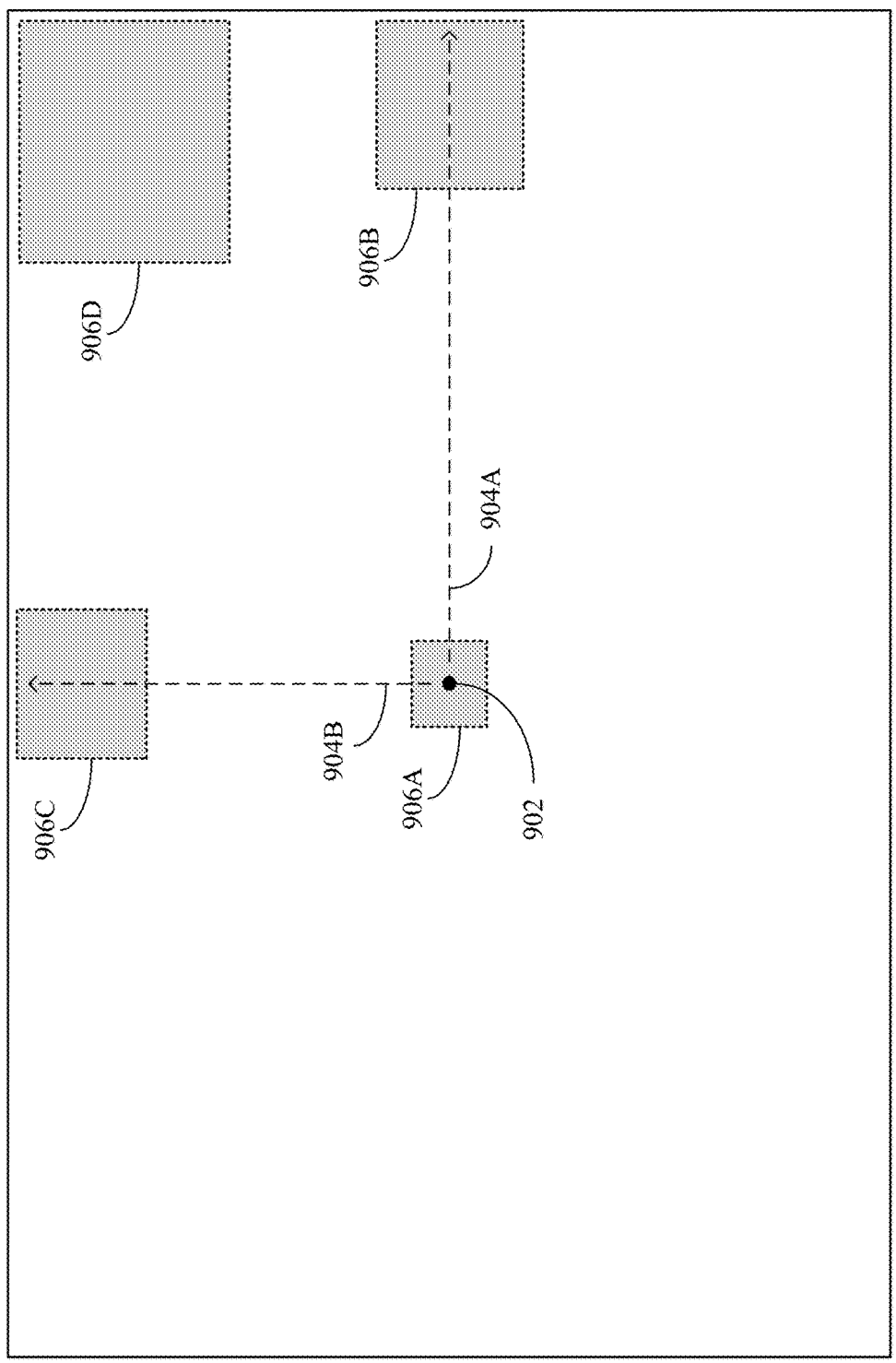
FIG. 9 is a depiction of a spatial distribution including one or more codewords with the spatial size of the codeword increasing and the aspect ratio of the codeword remaining the same as the distance of the codeword from the center of the spatial distribution increases.

FIG. 9 is a depiction of a spatial distribution 900 including one or more codewords, with the spatial size of the codeword increasing and the aspect ratio of the codeword remaining the same as the distance of the codeword from the center 902 of the spatial distribution 900 increases. As shown, the codeword at region 906A may increase in size to region 906B as the distance 904A increases. The codeword at region 906A may also increase in size to region 906C as the distance 904B increases. The codeword at region 906D illustrates an increase in the size of the codeword at region 906A corresponding to distance 904A and distance 904B. The size of the codeword at region 906D is greater than the size of the codeword at regions 906B and 906C. The aspect ratio of the codeword remains the same for the different regions of the spatial distribution, as shown by regions 906A, 906B, 906C, and 906D.

Figure 10:
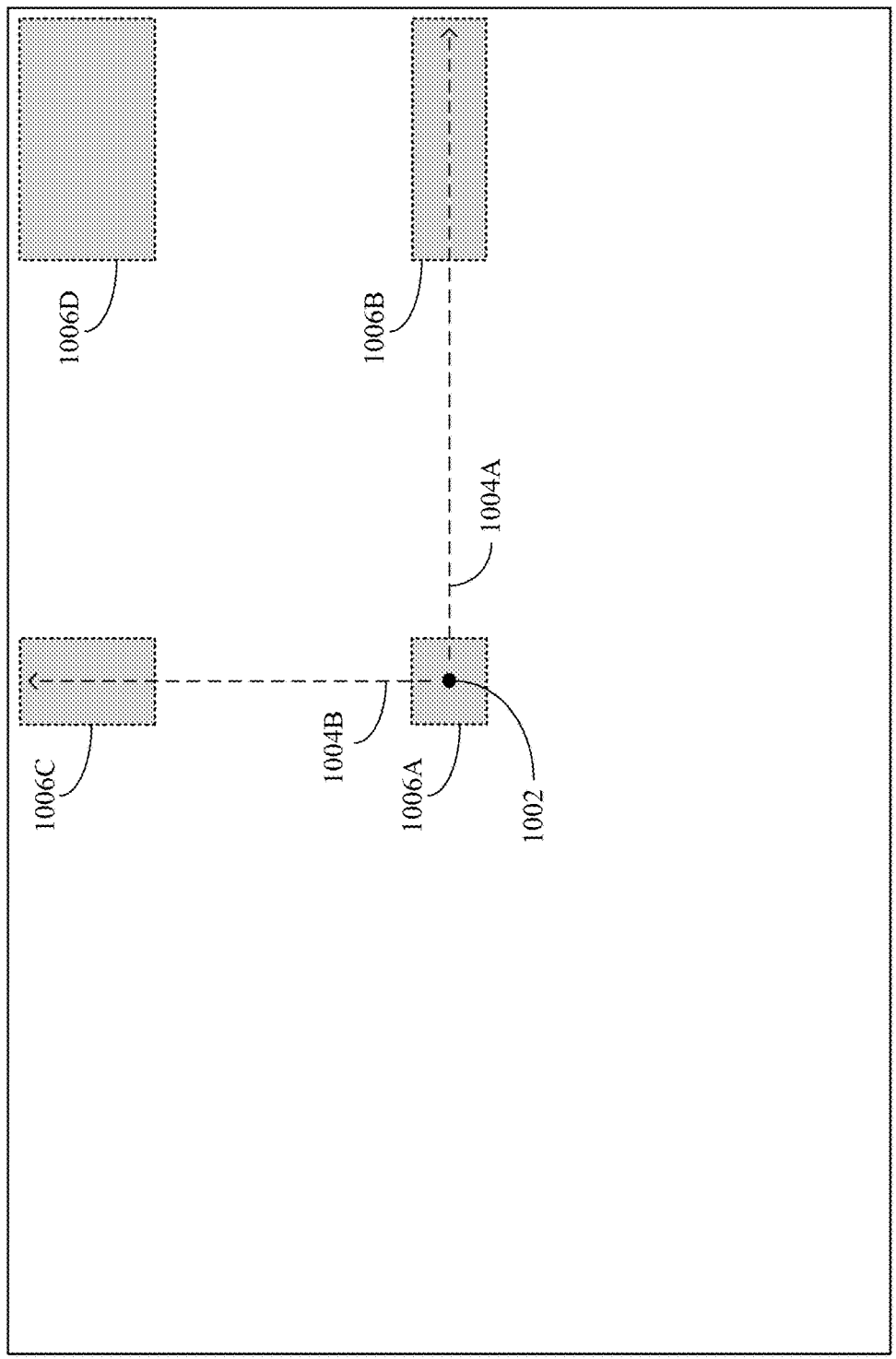
FIG. 10 is a depiction of a spatial distribution including one or more codewords with the spatial size of the codeword increasing and skewing as the distance of the codeword from the center of the spatial distribution increases.

Alternative to the aspect ratio remaining the same as the size of a codeword changes, the aspect ratio of the codeword may change with an increase in the size of the codeword as the distance from the center of the spatial distribution increases. For example, for a codeword centered at the center of a spatial distribution and with a defined aspect ratio, the size of the codeword may skew or stretch along the direction away from the center of the spatial distribution. FIG. 10 is a depiction of a spatial distribution 1000 including one or more codewords, with the spatial size of the codeword increasing and skewing as the distance of the center of the codeword from the center 1002 of the spatial distribution 1000 increases. As shown, the size of the codeword along a distance away from the center 1002 may increase. For example, the size of a codeword at region 1006A of the spatial distribution 1000 may skew along the direction of the distance 1004A as the distance 1004A from the center 1002 of the spatial distribution 1000 increases (as illustrated by the region 1006B). Similarly, the size of the codeword at region 1006A of the spatial distribution 1000 may skew along the direction of the distance 1004B as the distance 1004B increases (as illustrated by the region 1006C). The codeword at region 1006D illustrates an increase in the size of the codeword at region 1006A corresponding to distance 1004A and distance 1004B. In some example implementations, the size of the codeword may remain the same in the direction of distance 1004A if distance 1004A is zero. In this manner, the aspect ratio of a codeword in a first region of the spatial distribution may be skewed relative to a codeword in a second region of the spatial distribution where the distance between the center and the first region differs from the distance between the center and the second region.

While FIG. 9 and FIG. 10 depict the shape or outline of the spatial distribution and codeword as a square or rectangle, other suitable shapes or outlines of the spatial distribution and codewords may be implemented, and the present disclosure should not be limited to any specific examples.

In some example implementations for codewords increasing in size as the distance from the center of the spatial distribution increases, the points of the spatial distribution may be arranged so that the codewords either retain their aspect ratio (such as 1×1) or are stretched or skewed along the direction away from the center of the spatial distribution. If the aspect ratio of a codeword is to remain the same, the non-linear, linear, or stepwise decrease in density may be measured at the codeword level. For example, groups of points of the spatial distribution for each codeword may be uniformly spaced, with changes in the spacing of points occurring between codewords of the spatial distribution. In one example, referring to FIG. 8C for a stepwise decrease in density, codewords in a first range less than a distance 806A from the center of the spatial distribution may be of the same size, codewords in a second range between distances 806A to 806B may be the same size but a greater size than codewords in the first range, and so on. In another example, referring to FIG. 7 for linear and non-linear decreases in density, codewords along the rectangle 706A may be of the same size. If the edge of rectangle 706B is one or more codeword lengths away from the edge of rectangle 706A, the codewords along the rectangle 706B may be larger than the codewords along the rectangle 706A. The increase in codeword size may be linear or non-linear as the distance 704 increases.

If the aspect ratio of a codeword stretches along a direction away from the center of the spatial distribution, the points within a codeword may be non-uniformly spaced. For example, referring back to FIG. 10, a point at the right portion of the region 1006B may be spaced further from its left and right neighboring points than a point at the left portion of the region 1006B.

In some example implementations, varying the density of the spatial distribution may include manufacturing a transmitter of an active depth system (such as transmitter 102 in FIG. 1) to project light in a spatial distribution with different densities of light points for different portions of the spatial distribution. For example, a DOE may be manufactured so that the number of emitted light points from a portion of the DOE is of greater or less density than the number of emitted light points from a different portion of the DOE when the transmitter is projecting. Additionally or alternatively, the light sources of a transmitter may be arranged so that different regions of the spatial distribution have different densities. For example, an array or grid of lasers (such as vertical-cavity surface-emitting lasers (VCSELs)) may be arranged so that different regions of the spatial distribution have different densities of light points.

FIG. 11 is a flow chart depicting an example operation 1100 for manufacturing an active depth system with different regions of the spatial distribution having different densities of light points. At 1102, a transmitter (such as the transmitter 102 in FIG. 1) may be manufactured to include one or more light sources to transmit light in a spatial distribution, with the density of light points greater in a first region of the spatial distribution than in a second region of the spatial distribution. For example, the transmitter may be manufactured so that the density of light points for a region of the spatial distribution decreases as a distance between the center of the spatial distribution and a center of the region increases (1104). In some example implementations, one or more DOEs may be manufactured and/or the light sources may be arranged in the transmitter so that the density of light points varies.

At 1106, a receiver (such as the receiver 108 in FIG. 1) is manufactured to receive reflections of the light to be transmitted by the transmitter. In some example implementations, the receiver sensor is configured so that the center of the sensor is to receive the portion of the reflections corresponding to the center of the spatial distribution for reflections from objects a determined depth from the system (1108). In this manner, a first distance between a center of the receiver sensor and a center of the first region of the spatial distribution received at the sensor is less than a second distance between the center of the sensor and a center of the second region received at the sensor. In other words, the second region of the reflections of the spatial distribution may hit the receiver sensor further from the center of the sensor than the first region of the reflections of the spatial distribution hits the receiver sensor.

In some example implementations, the pixels of the receiver sensor may be arranged to correspond to the varying density of light points of the spatial distribution for the transmitter. In this manner, the density of pixels closer to the center of the sensor may be greater than the density of pixels further from the center of the sensor. For example, an array of photodiodes (such as APDs) may be arranged to correspond to the spatial distribution for the transmitter. In some other example implementations, the receiver sensor may be a conventional receiver sensor, with the pixels being uniformly dispersed throughout the receiver sensor.

Additional or alternative to manufacturing the active depth system to project light in a spatial distribution having different densities of light points at different regions, a device (such as device 200 in FIG. 2) may control the active depth system to vary the density of light points of the spatial distribution. In one example, a plurality of microelectromechanical systems (MEMS) may be used to move a plurality of mirrors in order to change the diffusion of the light sources of the transmitter. In another example, each light source of the transmitter may be turned on or off to control the number of emissions that appear for each portion of the projection from the transmitter. Other suitable means for altering the spatial distribution or density of light points may be used, and the present disclosure should not be limited to a specific example.

FIG. 12 is a flow chart depicting an example operation 1200 of an active depth system. At 1202, the active depth system may transmit a spatial distribution of light points using one or more light sources. In transmitting the spatial distribution of light points, the active depth system may transmit a first region of the spatial distribution having a density of light points greater than a second region of the spatial distribution when a distance between the center of the first region and the center of the spatial distribution is less than the distance between the center of the second region and the center of the spatial distribution (1204). The active depth system may also receive reflections of transmitted light (1206). For example, the active depth system may receive one or more reflections of the transmitted light points (1208).

After receiving the reflections, a device or the active depth system may identify codewords or otherwise analyze the reflections to determine one or more depths.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software (such as a device altering the spatial distribution for an included active depth system), the techniques may be realized at least in part by a non-transitory processor-readable storage medium (such as the memory 206 in the example device 200 of FIG. 2) comprising instructions 208 that, when executed by the processor 204 (or the light controller 210 or the signal processor 212), cause the device 200 to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 204 or the signal processor 212 in the example device 200 of FIG. 2. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. For example, while the active depth system is described as using light (such as NIR), signals at other frequencies may be used, such as microwaves, radio frequencies, other infrared, ultraviolet, and visible light. Additionally, the functions, steps or actions of the method claims in accordance with aspects described herein need not be performed in any particular order unless expressly stated otherwise. For example, the steps of the described example operations, if performed by the device 200, the light controller 210, the processor 204, and/or the signal processor 212, may be performed in any order. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. An active depth system, comprising:
a receiver to receive reflections of transmitted light; and
a transmitter including an array of light sources, the array of light sources configured to transmit light in a spatial distribution including a first region of a first plurality of light points and a second region of a second plurality of light points, the first plurality of light points of the spatial distribution including at least a first set of pre-defined points of a plurality of pre-defined points for determining first depth information based on reflected light points, and the second plurality of light points of the spatial distribution including at least a second set of pre-defined points of the plurality of pre-defined points for determining second depth information based on the reflected light points, wherein:
a first density of the first plurality of light points of the spatial distribution transmitted by the array of light sources is greater than a second density of the second plurality of light points of the spatial distribution transmitted by the array of light sources; and
a first distance between a center of the spatial distribution transmitted by the array of light sources and a center of the first region is less than a second distance between the center of the spatial distribution transmitted by the array of light sources and the center of the second region.

2. The active depth system of claim 1, wherein:
the first set of pre-defined points includes a first codeword of a plurality of codewords and the second set of pre-defined points includes a second codeword of the plurality of codewords; and
a size of the first codeword is less than a size of the second codeword.

3. The active depth system of claim 2, wherein an aspect ratio of the first codeword is the same as an aspect ratio of the second codeword.

4. The active depth system of claim 2, wherein an aspect ratio of the first codeword is skewed relative to an aspect ratio of the second codeword.

5. The active depth system of claim 1, wherein the transmitter includes a diffractive optical element configured to produce at least a portion of the spatial distribution.

6. The active depth system of claim 1, wherein a density of light points in a region of the spatial distribution decreases as a distance between the center of the spatial distribution and a center of the region increases.

7. The active depth system of claim 6, wherein the density of light points is consistent along an elliptical or circular boundary centered at the center of the spatial distribution.

8. The active depth system of claim 6, wherein the density of light points is consistent along a rectangular or square boundary centered at the center of the spatial distribution.

9. The active depth system of claim 6, wherein a rate of decrease in the density of light points in the region is one from the group consisting of:
stepwise from the center of the spatial distribution;
linear from the center of the spatial distribution; and
based on an effective aperture through which the reflections of transmitted light are received by the receiver.

10. A method of performing active depth measurement, comprising:
transmitting, by a transmitter including an array of light sources, light in a spatial distribution including a first region of a first plurality of light points and a second region of a second plurality of light points, the first plurality of light points of the spatial distribution including at least a first set of pre-defined points of a plurality of pre-defined points for determining first depth information based on reflected light points, and the second plurality of light points of the spatial distribution including at least a second set of pre-defined points of the plurality of pre-defined points for determining second depth information based on the reflected light points, wherein:
a first density of the first plurality of light points of the spatial distribution transmitted by the array of light sources is greater than a second density of the second plurality of light points of the spatial distribution transmitted by the array of light sources; and
a first distance between a center of the spatial distribution transmitted by the array of light sources and a center of the first region is less than a second distance between the center of the spatial distribution transmitted by the array of light sources and the center of the second region; and
receiving, by a receiver, reflections of the transmitted light.

11. The method of claim 10, wherein:
the first set of pre-defined points includes a first codeword of a plurality of codewords and the second set of pre-defined points includes a second codeword of the plurality of codewords; and
a size of the first codeword is less than a size of the second codeword.

12. The method of claim 11, wherein an aspect ratio of the first codeword is the same as an aspect ratio of the second codeword.

13. The method of claim 11, wherein an aspect ratio of the first codeword is skewed relative to an aspect ratio of the second codeword.

14. The method of claim 10, wherein transmitting light in the spatial distribution includes transmitting light having a density of light points in a region of the spatial distribution that decreases as a distance between the center of the spatial distribution and a center of the region increases.

15. The method of claim 14, wherein transmitting light having the density of light points in the region of the spatial distribution includes one from the group consisting of:
the density of light points being consistent along an elliptical or circular boundary centered at the center of the spatial distribution; and
the density of light points being consistent along a rectangular or square boundary centered at the center of the spatial distribution.

16. The method of claim 14, wherein a rate of decrease in the density of light points in the region is one from the group consisting of:
stepwise from the center of the spatial distribution;
linear from the center of the spatial distribution; and
based on an effective aperture through which the reflections of transmitted light are received by the receiver.

17. A non-transitory computer-readable medium storing one or more programs containing instructions that, when executed by one or more processors of a device, cause the device to perform operations comprising:
transmitting, by a transmitter including an array of light sources, light in a spatial distribution including a first region of a first plurality of light points and a second region of a second plurality of light points, the first plurality of light points of the spatial distribution including at least a first set of pre-defined points of a plurality of pre-defined points for determining first depth information based on reflected light points, and the second plurality of light points of the spatial distribution including at least a second set of pre-defined points of the plurality of pre-defined points for determining second depth information based on the reflected light points, wherein:
a first density of the first plurality of light points of the spatial distribution transmitted by the array of light sources is greater than a second density of the second plurality of light points of the spatial distribution transmitted by the array of light sources; and
a first distance between a center of the spatial distribution transmitted by the array of light sources and a center of the first region is less than a second distance between the center of the spatial distribution transmitted by the array of light sources and the center of the second region; and receiving, by a receiver, reflections of the transmitted light.

18. The non-transitory computer-readable medium of claim 17, wherein:
the first set of pre-defined points includes a first codeword of a plurality of codewords and the second set of pre-defined points includes a second codeword of the plurality of codewords; and
a size of the first codeword is less than a size of the second codeword.

19. The non-transitory computer-readable medium of claim 18, wherein an aspect ratio of the first codeword is the same as an aspect ratio of the second codeword.

20. The non-transitory computer-readable medium of claim 18, wherein an aspect ratio of the first codeword is skewed relative to an aspect ratio of the second codeword.

21. The non-transitory computer-readable medium of claim 17, wherein execution of the instructions for transmitting light in the spatial distribution causes the device to perform operations comprising transmitting light having a density of light points in a region of the spatial distribution that decreases as a distance between the center of the spatial distribution and a center of the region increases.

22. The non-transitory computer-readable medium of claim 21, wherein execution of the instructions for transmitting light in the spatial distribution causes the device to perform operations further comprising transmitting light having the density of light points in the region of the spatial distribution being one from the group consisting of:
consistent along an elliptical or circular boundary centered at the center of the spatial distribution; and
consistent along a rectangular or square boundary centered at the center of the spatial distribution.

23. The non-transitory computer-readable medium of claim 21, wherein a rate of the decrease in density of light points in the region is one from the group consisting of:
stepwise from the center of the spatial distribution;
linear from the center of the spatial distribution; and
based on an effective aperture through which the reflections of transmitted light are received by the receiver.

24. An active depth system, comprising:
one or more processors; and
a memory coupled to the one or more processors and including instructions that, when executed by the one or more processors, cause the system to perform operations comprising:
transmitting, by a transmitter including an array of light sources, light in a spatial distribution including a first region of a first plurality of light points and a second region of a second plurality of light points, the first plurality of light points of the spatial distribution including at least a first set of pre-defined points of a plurality of pre-defined points for determining first depth information based on reflected light points, and the second plurality of light points of the spatial distribution including at least a second set of pre-defined points of the plurality of pre-defined points for determining second depth information based on the reflected light points, wherein:
a first density of the first plurality of light points of the spatial distribution transmitted by the array of light sources is greater than a second density of the second plurality of light points of the spatial distribution transmitted by the array of light sources; and
a first distance between a center of the spatial distribution transmitted by the array of light sources and a center of the first region is less than a second distance between the center of the spatial distribution transmitted by the array of light sources and the center of the second region; and
receiving, by a receiver, reflections of the transmitted light.

25. The active depth system of claim 24, wherein:
the first set of pre-defined points includes a first codeword of a plurality of codewords and the second set of pre-defined points includes a second codeword of the plurality of codewords; and
a size of the first codeword is less than a size of the second codeword.

26. The active depth system of claim 25, wherein an aspect ratio of the first codeword is the same as an aspect ratio of the second codeword.

27. The active depth system of claim 25, wherein an aspect ratio of the first codeword is skewed relative to an aspect ratio of the second codeword.

28. The active depth system of claim 24, wherein execution of the instructions for transmitting light in the spatial distribution causes the system to perform operations comprising transmitting light having a density of light points in a region of the spatial distribution that decreases as a distance between the center of the spatial distribution and a center of the region increases.

29. The active depth system of claim 28, wherein execution of the instructions for transmitting light in the spatial distribution causes the system to perform operations further comprising transmitting light having the density of light points in the region of the spatial distribution including one from the group consisting of:
the density of light points being consistent along an elliptical or circular boundary centered at the center of the spatial distribution; and
the density of light points being consistent along a rectangular or square boundary centered at the center of the spatial distribution.

30. The active depth system of claim 28, wherein a rate of the decrease in the density of light points in the region is one from the group consisting of:
stepwise from the center of the spatial distribution;
linear from the center of the spatial distribution; and
based on an effective aperture through which the reflections of transmitted light are received by the receiver.

* * * * *